(12) United States Patent
Minagawa

(10) Patent No.: US 11,687,232 B2
(45) Date of Patent: Jun. 27, 2023

(54) DISPLAY APPARATUS, DISPLAY METHOD, AND NON-TRANSITORY RECORDING MEDIUM

(71) Applicant: Fumihiko Minagawa, Chiba (JP)

(72) Inventor: Fumihiko Minagawa, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/683,369

(22) Filed: Mar. 1, 2022

(65) Prior Publication Data

US 2022/0291828 A1 Sep. 15, 2022

(30) Foreign Application Priority Data

Mar. 10, 2021 (JP) .............................. JP2021-038081

(51) Int. Cl.
*G06F 3/048* (2013.01)
*G06F 3/04883* (2022.01)
*G06V 30/32* (2022.01)
*G06F 3/04845* (2022.01)
*G06F 3/04842* (2022.01)

(52) U.S. Cl.
CPC ...... *G06F 3/04883* (2013.01); *G06F 3/04842* (2013.01); *G06F 3/04845* (2013.01); *G06V 30/347* (2022.01); *G06V 30/36* (2022.01)

(58) Field of Classification Search
CPC ............. G06F 3/04883; G06F 3/04842; G06F 3/04845; G06V 30/347; G06V 30/36
See application file for complete search history.

(56) References Cited

U.S. PATENT DOCUMENTS

| | | | |
|---|---|---|---|
| 5,493,639 A * | 2/1996 | Hirano | G06T 11/60 345/441 |
| 9,715,623 B2 * | 7/2017 | VanBlon | G06V 30/347 |
| 10,296,207 B2 * | 5/2019 | VanBlon | G06F 3/04883 |
| 2006/0112333 A1 * | 5/2006 | Iwanaga | G06F 40/109 715/256 |
| 2009/0063645 A1 * | 3/2009 | Casey | H04N 21/4788 709/206 |
| 2012/0014601 A1 * | 1/2012 | Jiang | G06F 1/169 382/173 |
| 2014/0129931 A1 * | 5/2014 | Hashiba | G06F 3/0483 715/268 |
| 2017/0262250 A1 | 9/2017 | Tanabe et al. | |
| 2017/0293826 A1 | 10/2017 | Kemmochi et al. | |
| 2018/0075296 A1 * | 3/2018 | Matsuda | G06F 3/04883 |

FOREIGN PATENT DOCUMENTS

| | | |
|---|---|---|
| JP | 2014-056517 | 3/2014 |
| JP | 2015-191565 | 11/2015 |
| JP | 2016-134014 | 7/2016 |

* cited by examiner

*Primary Examiner* — Mahelet Shiberou
(74) *Attorney, Agent, or Firm* — Xsensus LLP

(57) ABSTRACT

A display apparatus includes circuitry to receive a handwriting input within a frame of a line displayed on a display. The handwriting input is corresponding to a part of a character string including one or more characters. The circuitry obtains, based on the handwriting input, a character size. The circuitry expands the frame in a direction of the handwriting input, based on the character size and space currently being left between the handwriting input and a side of the frame in the direction of the handwriting input to receive another handwriting input.

20 Claims, 13 Drawing Sheets

(a)

(b)

(c)

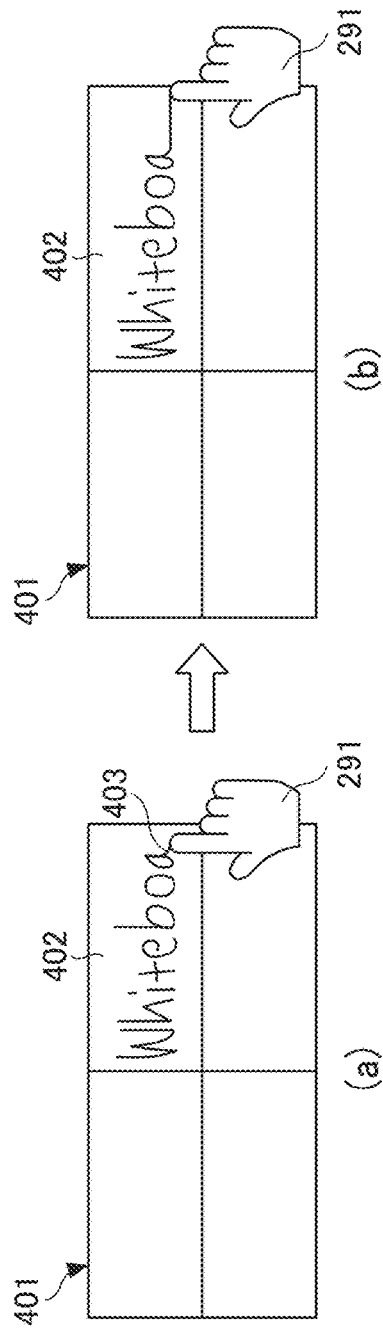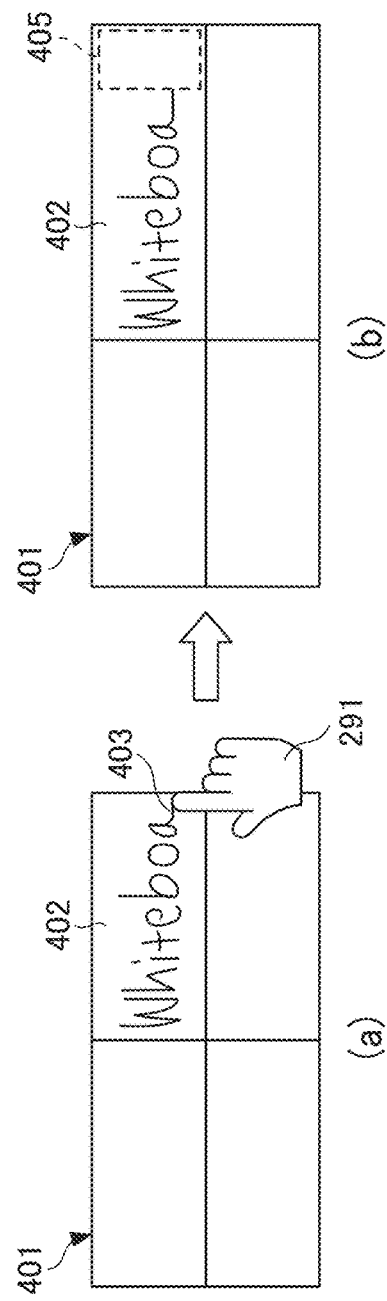

DISPLAY APPARATUS, DISPLAY METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2021-038081, filed on Mar. 10, 2021, in the Japan Patent Office, the entire disclosure of which is hereby incorporated by reference.

BACKGROUND

Technical Field

Embodiments of the present disclosure relate to a display apparatus, a display method, and a non-transitory recording medium.

Related Art

Display apparatuses that convert handwritten data into text and displays the text on a display by using a handwriting recognition technique are known. A display apparatus having a relatively large touch panel is used in a conference room and is shared by a plurality of users as an electronic whiteboard, for example.

The display apparatus allows a user to input handwriting representing text within a frame of a figure or a table, for example. A technique for fitting text within a frame when the frame is too small for the text to be fit in the frame is known. With such a technique, when a character string of handwriting does not fit within a frame, a size of a handwritten character included in the character string is automatically reduced to an appropriate size so that the character string fits within the frame.

SUMMARY

An embodiment of the present disclosure includes a display apparatus including circuitry to receive a handwriting input within a frame of line displayed on a display. The handwriting input is corresponding to a part of a character string, including one or more characters. The circuitry obtains, based on the handwriting input, a character size. The circuitry expands the frame in a direction of the handwriting input, based on the character size and space currently being left between the handwriting input and a side of the frame in the direction of the handwriting input to receive another handwriting input.

An embodiment of the present disclosure includes a display method. The display method includes receiving a handwriting input within a frame of line displayed on a display. The handwriting input is corresponding to a part of a character string including one or more characters. The display method includes obtaining, based on the handwriting input, a character size and expanding the frame in a direction of the handwriting input, based on the character size and space currently being left between the handwriting input and a side of the frame in the direction of the handwriting input to receive another handwriting input.

An embodiment of the present disclosure includes a non-transitory recording medium storing a plurality of instructions which, when executed by one or more processors, causes the processors to perform a method. The method includes receiving a handwriting input within a frame of line displayed on a display. The handwriting input is corresponding to a part of a character string including one or more characters. The method includes obtaining, based on the handwriting input, a character size and expanding the frame in a direction of the handwriting input, based on the character size and space currently being left between the handwriting input and a side of the frame in the direction of the handwriting input to receive another handwriting input.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a diagram illustrating how a size of a frame is changed according to a comparative example of one or more embodiments;

FIG. 2 is a diagram illustrating bow a display apparatus expands a frame, according to a first embodiment;

Figure 3:
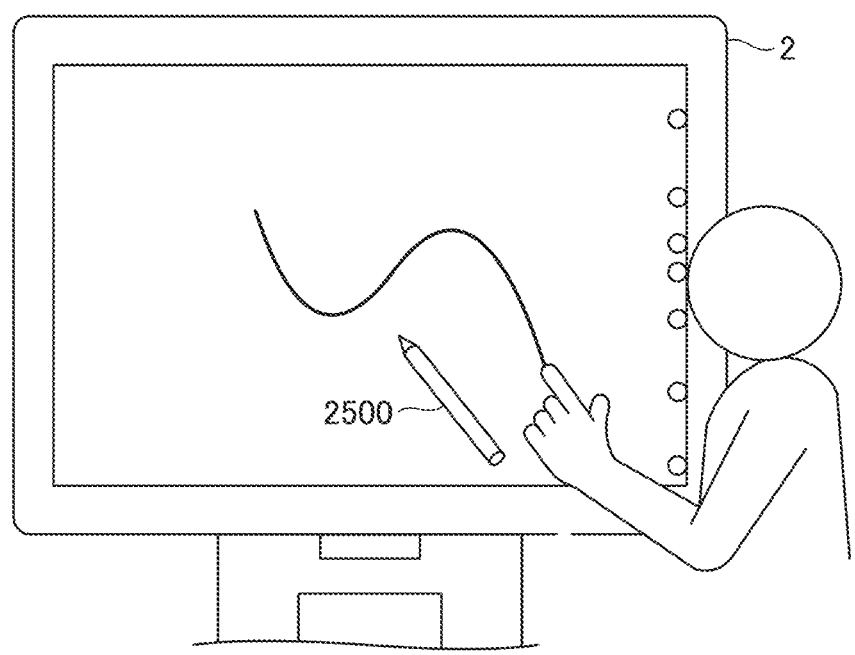
FIG. 3 is a schematic perspective view illustrating an example structure of the display apparatus according to the first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given below of a display apparatus and a display method performed by the display apparatus according to one or more embodiments of the present disclosure, with reference to the attached drawings.

First Embodiment

Comparative Example

A description is given below of a comparative example with respect to a display apparatus 2 according to a first embodiment, with reference to FIG. 1. FIG. 1 is a diagram illustrating an example of how a size of a frame 402 of a table 401 is changed. It should be noted that the comparative example is not a prior art.

As illustrated in (a) of FIG. 1, the number of the frames 402 of the table 401 is four. When characters represented by handwritten data being input as handwriting input using an input device 291 according to a user operation do not fit in the frame 402, the display apparatus 2 expands the frame 402 in accordance with stroke data 403 being input as a part of the handwritten characters. In other words, an area in the frame 402 is enlarged according to the stroke data 403.

As illustrated in (b) of FIG. 1, as coordinates of the stroke data being input as handwriting, input, move to the right, the display apparatus 2 expands the frame 402 to the right.

With a such method of expanding the frame 402 in accordance with the coordinates of the stroke data being input as handwriting input, sufficient space between the right end of the handwriting represented by the handwritten data and a right side of the frame 402 never appears. This may make the user feel uncomfortable to continue writing in a right direction, which is a handwriting direction. For example, when the user desires to input a next stroke data by handwriting input to the right of the stroke data being input (for example, in case of "S" that is written from tipper right to lower left, in case of period or comma), there is not enough space for a next stroke represented by the next stroke data to be input. Such a situation is illustrated in (c) of FIG. 1. In FIG. 1C, the user stops handwriting input, and there is no space for a next character (stroke). In this case, the user changes a current size of the frame 402 and then continues the handwriting input.

Overview of Operation of Display Apparatus:

FIG. 2 is a diagram illustrating how the display apparatus 2 expands the frame 402, according to the first embodiment. As illustrated in (a) of FIG. 2, there is no space in the right side of the area of the frame 402 for writing additional characters. When the tip of the input device 291 is separated from a display, the display apparatus 2 determines how much space is left for writing. When determining that the space is insufficient, the display apparatus 2 expands the frame 402 as illustrated in (b) of FIG. 2, so that a space for writing a single character is generated.

For example, the display apparatus 2 calculates a size corresponding to a single character, which may be referred to as a character size in the following description, based on the stroke data included in the handwritten data, which has been already input, in the frame 402. When the space in the right area, namely the space between the right end of the handwriting represented by the handwritten characters and the frame in the handwriting direction (a right side of the frame), becomes less than the character size, the display apparatus 2 expands the frame 402 in the handwriting direction, which may be referred to as a right direction in this case, by at least a size of the character size, which is a size corresponding to a single character. This allows the user to write a next character in a space 405 that is larger than the character size, which is a size corresponding to a single character.

Terms:

"Input device" may be any devices with each of which handwriting input is performable by designating coordinates on a touch panel. Examples thereof include a pen, a human finger, a human hand, and a bar-shaped member.

A series of user operations including engaging a writing mode, recording movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse. "Stroke data" is data based on a trajectory of coordinates of a stroke input with the input device, and the coordinates may be interpolated appropriately. "Handwritten data" is data having one or more stroke data, namely including stroke data corresponding to one or more strokes. "Handwriting input" represents input of handwritten data according to a user operation.

The following discussion will refer to handwriting input and handwriting data, but other forms of hand drafted input ma be utilized and are within the scope of the present disclosure. That is, the handwriting input or handwriting data may be alternatively referred to as "hand drafted input," which relates to a user input such as handwriting, drawing and other forms of input.

An "object" refers to an item displayed on a screen. The term "object" in this specification represents an object of display. Examples of "object" include objects displayed based on stroke data, objects obtained by handwriting recognition from stroke data, graphics, images, characters, and the like. A character string obtained by character recognition (handwritten text recognition) and conversion may include, in addition to text data, data displayed according to a user operation, such as a stamp of a given (default) character or mark such as "complete," and a graphic including a circle, and a shape of star.

The character string is one or more character codes (fonts) converted from handwritten data by character recognition. The character string may be one or more characters handled by a computer. The characters include numbers, alphabets, and symbols, for example. The character string is also referred to as text data.

The frame is a line contour and made with at least four straight lines, for example. Examples of the frame include a cell of a table and a quadrilateral which is one of plane shapes.

The space means (a) space, a room, or a margin, for example, in the description of the embodiments, a space between a character and a frame is referred to as a space or space.

To "expand" means to widen a range in order to make a size be larger, or to make more space. To "expand" may be replaceable with to "enlarge." To "reduce" a frame refers to reduce a size of an area in the frame.

Configuration:

FIG. 3 is a schematic perspective view illustrating an example structure of the display apparatus 2. A user uses the display apparatus 2. In the display apparatus 2 according to the present embodiment, the user can perform handwriting on a screen with the input device 291 such as a hand or an electronic pen 2500.

Although the display apparatus 2 illustrated in FIG. 3 is placed landscape, the display apparatus 2 may be placed portrait. The user can rotate the display apparatus 2 around the center of the display as an axis for switching between the landscape placement and the portrait placement.

Figure 4:
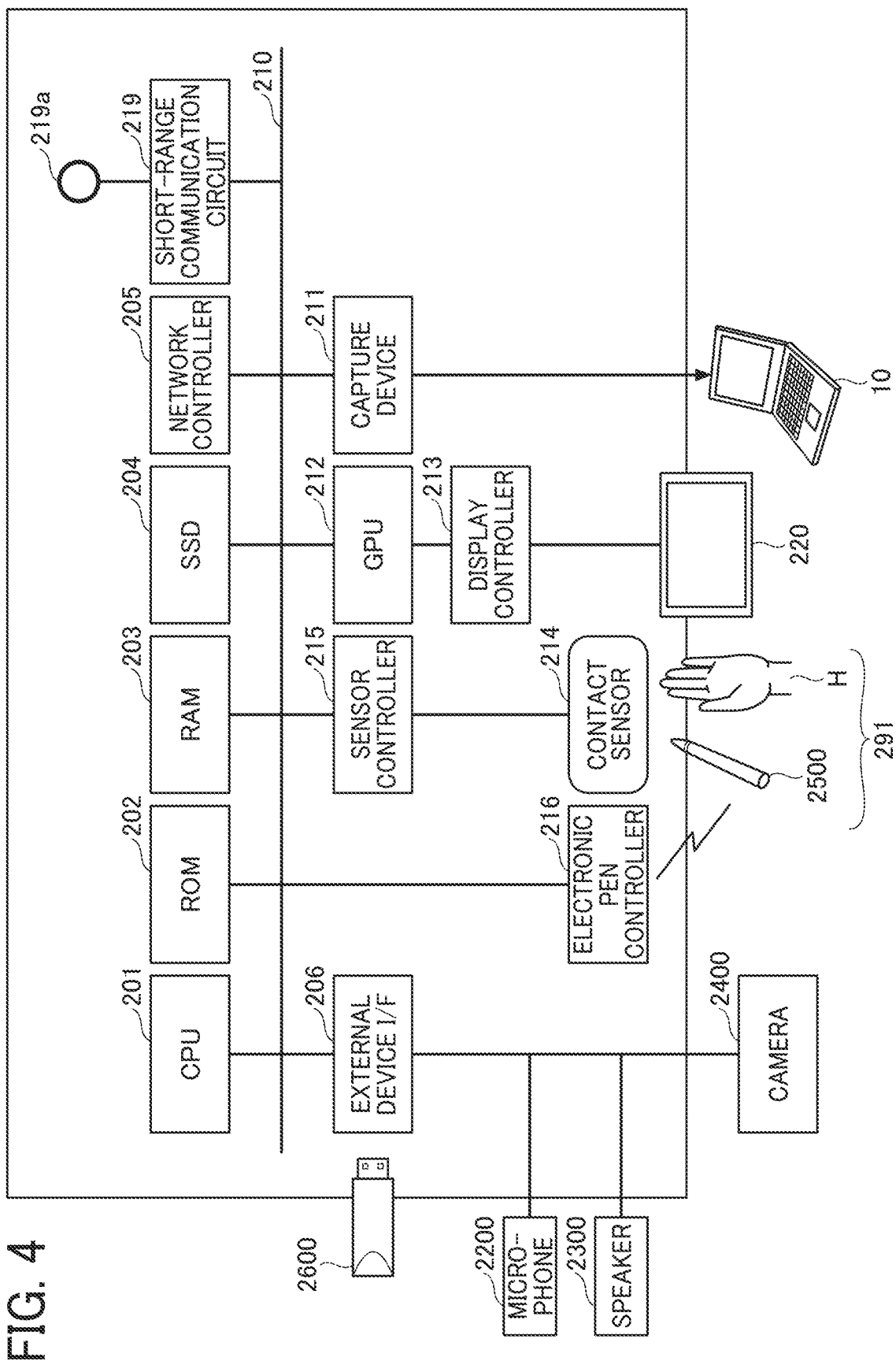
FIG. 4 is a block diagram illustrating an example of a hardware configuration of the display apparatus according to the first embodiment.

Hardware Configuration:

FIG. 4 is a block diagram illustrating an example of a hardware configuration of the display apparatus 2. The display apparatus 2 includes a central processing unit (CPU) 201, a read only memory (ROM) 202, a random-access memory (RAM) 203, a solid-state drive (SSD) 204, a network controller 205, and an external device I/F 206. The display apparatus 2 is a shared terminal for sharing information.

The CPU 201 performs control of the overall operation of the display apparatus 2. The ROM 202 stores a control program such as an initial program loader (IPL) to boot the CPU 201. The RAM 203 is used as a work area for the CPU 201.

The SSD 204 stores various data such as a control program for the display apparatus 2. This program may be an application program that runs on an information processing apparatus equipped with a general-purpose operating system (OS) such as WINDOWS, MAC OS, ANDROID, and IOS.

The network controller 205 controls communication with an external device through a network. The external device connection I/F 206 controls communication with a universal serial bus (USB) memory 2600, and external devices such as a camera 2400, a speaker 2300, a microphone 2200, etc.

The display apparatus 2 further includes a capture device 211, a graphics processing unit (GPU) 212, a display controller 213, a contact sensor 214, a sensor controller 215, an electronic pen controller 216, the short-range communication circuit 219, and an antenna 219a for the short-range communication circuit 219.

The capture device 211 causes a display of a PC 10 to display a still image or a video image based on image data that is captured by the capture device 211. The GPU 212 is a semiconductor chip dedicated to graphics. The display controller 213 controls display of an image processed at the GPU 212 for outputting on a display 220 of the display apparatus 2.

The contact sensor 214 detects a touch made onto the display 220 with an electronic pen 2500 or a user's hand H. The electronic pen 2500 and the hand H are collectively referred to as input devices 291 when not distinguished from each other.

The sensor controller 215 controls the contact sensor 214. The contact sensor 214 inputs and senses a coordinate by using an infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame.

The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by using the tip or bottom of the electronic pen 2500 to the display 220. The short-range communication circuit 219 is a communication circuit in compliance with a near field communication (NFC), a BLUETOOTH, or the like.

The display apparatus 2 further includes a bus line 210. Examples of the bus line 210 include art address bus and a data bus, which electrically connect the components including the CPU 201, one another.

The system of the contact sensor 214 is not limited to the infrared blocking system. Examples of the system employed by the contact sensor 214 include types of detector such as a capacitance touch panel that identifies the contact position by detecting, a change in capacitance, a resistance film touch panel that identifies the contact position by detecting a change in voltage of two opposed resistance films, and an electromagnetic induction touch panel that identifies the contact position by detecting electromagnetic induction caused by contact of an object to the display. In addition to or alternative to detecting a touch by the tip or bottom of the electronic pen 2500, the electronic pen controller 216 may also detect a touch by another part of the electronic pen 2500, such as a part held by a hand of the user.

Figure 5:
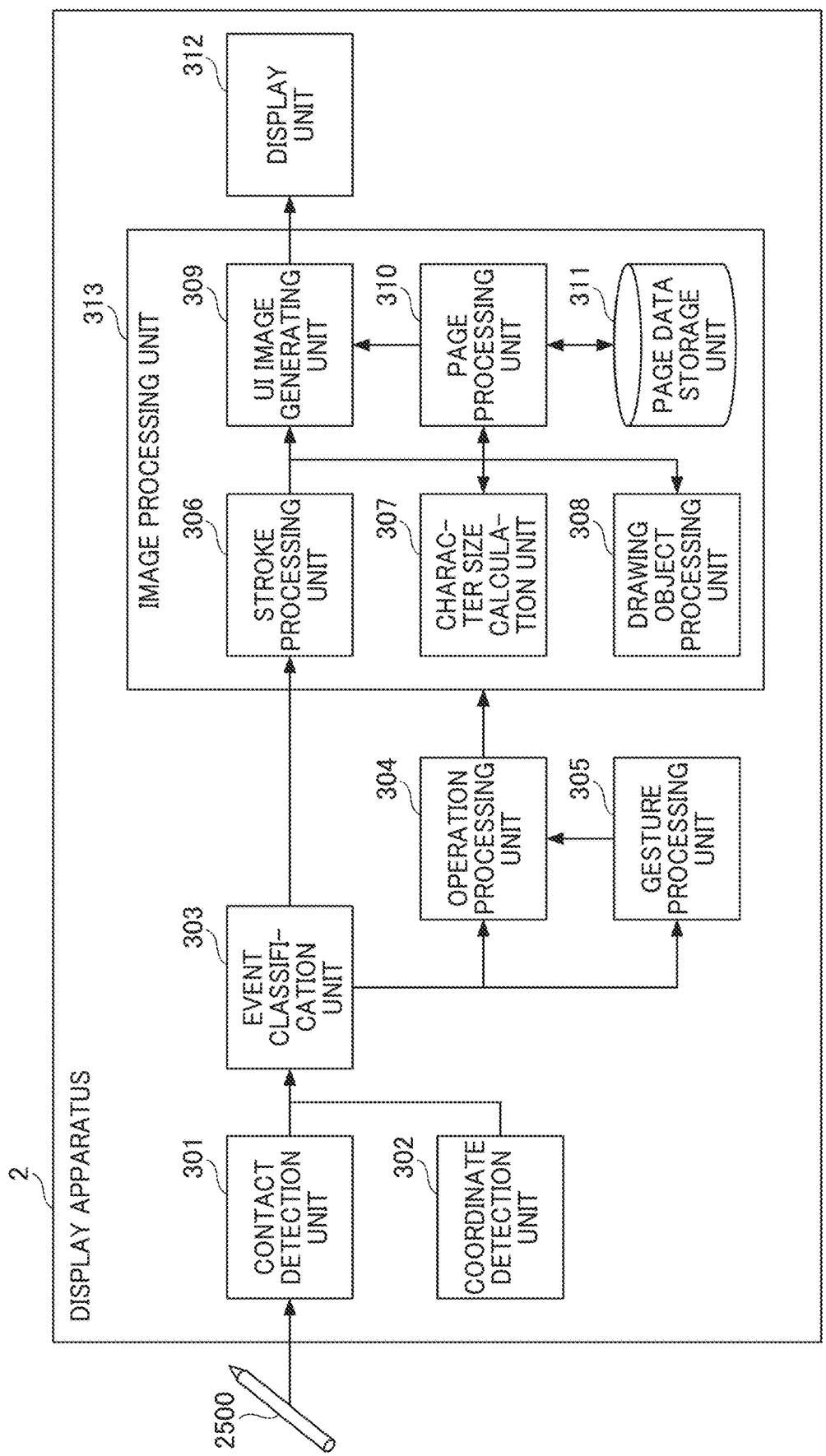
FIG. 5 is a block diagram illustrating an example of a functional configuration of the display apparatus according to the first embodiment.

Functions:

FIG. 5 is a block diagram illustrating an example of a functional configuration of the display apparatus 2 according to the present embodiment. The functional units of the display apparatus 2 illustrated in FIG. 5 are implemented by or are caused to function by operation of any of the elements illustrated in FIG. 4 according to an instruction from the CPU 201 according to a program loaded from the SSD 204 to the RAM 203.

The display apparatus 2 includes a contact detection unit 301 that detects contact of the input device 291 with the display 220 and a coordinate detection unit 302 that detects coordinates of a contact position. The contact detection unit 301 mainly transmits a signal indicating that the display 220 is pressed with the pen tip or the pen tail of the electronic pen 2500. The contact detection unit 301 detects contact based on the signal.

When the contact is detected by the contact detection unit 301, an event notification corresponding to an event corresponding to the contact is transmitted to the event classification unit 303 together with coordinate information detected by the coordinate detection unit 302.

The event classification unit 303 determines whether the contact is a user interface (UI) control operation, a gesture operation, or a stroke drawing operation, and distributes the contact to a processing unit corresponding to each operation. The UI control operation is defined as a user operation of pressing a button or an icon displayed as an operation menu. "UI" stands for "User Interface." The gesture operation is defined as a user operation of selecting, moving, or enlarging/reducing the handwritten data, for example.

When the contact of the input device 291 is determined as the UI control operation, the event is transmitted to the operation processing unit 304, and the operation processing unit 304 executes processing corresponding to a request of the user. A processing result of the processing is transmitted to an image processing unit 313, which is described later, in order to be reflected on the screen display.

When the contact of the input device 291 is determined as the gesture operation, the event is transmitted to the gesture processing unit 305, and the gesture processing unit 305 determines processing associated with the gesture performed by the user and instructs the operation processing unit 304 to execute the processing. The operation processing unit 304 executes the processing instructed by the gesture processing unit 305 in the substantially same manner as in the case of the UI control operation.

When the contact of the input device 291 is determined as the stroke drawing operation, the event is transmitted to the stroke processing unit 306. The stroke processing unit 306 draws the handwritten data on the basis of coordinate points of the stroke data, deletes drawn the handwritten data, or edits the drawn handwritten data, for example.

The character size calculation unit 307 calculates a size (width and height) of one stroke data or a size (width and height) corresponding to a character, a character size, in a character string drawn by the stroke processing unit 306. A method of calculating the character size is described later.

The drawing object processing unit 308 converts and edits the drawing objects such as straight lines, graphics, tables, and images. For example, the drawing object processing unit 308 converts the stroke data into, for example, a straight line, or a figure, a table, or converts the stroke data into, for example, text data using an optical character recognition (OCR) function. In addition, the drawing object processing unit 308 executes scaling (enlargement/reduction) or deformation of a drawing object such as a straight line, a figure, a table, or an image. The drawing object processing unit 308 performs enlargement (expansion) and reduction of the frame 402, which is described later. The drawing object processing unit 308 expands the frame according to the result of comparison between the calculated character size and the space between the frame in the handwriting direction and the handwritten character.

The stroke data output by the stroke processing unit 306 and the drawing object output by the drawing object processing unit 308 are drawn on a page managed by the page processing unit 310. The page processing unit 310 manages pages such as addition and deletion of pages and switching of pages to be displayed. Information including stroke data and a drawing object of each page is stored in the page data storage unit 311.

The UI image generation unit 309 generates information, which is information on which menu is to be displayed, output from the page processing unit 310 or an operation menu to be displayed on the screen based on a user operation. The generated operation menu is output to the display unit 312 and displayed on the display of the display apparatus 2.

TABLE 1

| OBJECT ID | TYPE | PAGE | COORDINATES | SIZE | ... |
|---|---|---|---|---|---|
| 1 | HANDWRITING | 1 | x1, y1 | W1, H1 | ... |
| 2 | TEXT | 1 | x2, y2 | W2, H2 | ... |
| 3 | GRAPHIC | 1 | x3, y3 | W3, H3 | ... |
| 4 | IMAGE | 2 | x4, y4 | W4, H4 | ... |
| 5 | GRAPHIC | 3 | x5, y5 | W5, H5 | ... |
| 6 | TEXT | 4 | x6, y6 | W6, H6 | ... |
| 7 | IMAGE | 4 | x7, y7 | W7, H7 | ... |
| ... | ... | ... | ... | ... | ... |

Table 1 schematically illustrates object information stored in the page data storage unit 311. The object information is information on various types of objects to be displayed by the display apparatus 2.

"Object identifier (ID)" is identification information identifying an object in a screen. "Object" refers to any of various types of objects displayed on the screen.

"Type" is a type of the object. Examples of the object type include table (row or column), handwriting, character, graphic, and image. "Table" represents a table object. "Handwriting" represents stroke data (coordinate point sequence). "Text" represents a character string (character codes) converted from handwritten data. A character string may be referred to as text data. "Graphic" is a geometric shape, such as a triangle or a tetragon, converted from handwritten data. "Image" represents image data in a format such as Joint Photographic Experts Group (JPEG), Portable Network Graphics (PNG), or Tagged Image File Format (TIFF) acquired from, for example, a PC or the Internet. Data of each object is stored in association with an object ID.

"Coordinates" represent the start point of the object with reference to a predetermined origin on the screen of the display apparatus 2. The start point of the drawing object is, for example, the upper left apex of the circumscribed rectangle of the drawing object. The coordinates are expressed, for example, in units of pixels of the display.

"Size" is a size (width and height) of the object. The end point position may be recorded.

TABLE 2

| | Column 1 | Column 2 | Column 3 | ... |
|---|---|---|---|---|
| Row 1 | Coordinates (x11, y11) Size W11, H11 | Coordinates (x12, y12) Size W12, H12 | Coordinates (x13, y13) Size W13, H13 | ... |
| Row 9 | Coordinates (x21, y21) Size W21, H21 | Coordinates (x22, y22) Size W22, H22 | Coordinates (x23, y23) Size W23, H23 | ... |
| ... | ... | ... | ... | ... |

Table 2 presents detailed information of a table. The table object is stored in association with an object ID and a table. One table has cells (cell frames) identified by the row number and the column number. The cell is an area of a table delimited by rows and columns. The detailed information includes coordinates and a size for each cell. Since the position of an object such as stroke data is known as presented in Table 1, the particular cell that contains the object is known.

Expanding Frame in Table:

A method of expanding the frame 402 is described with reference to FIG. 6. As illustrated in (a) of FIG. 6, the separates the tip of the input device 291 from the display after performing handwriting input representing "Whiteboa" in the frame 402 of the table 401. There is almost no space between the right end of the handwriting represented by the handwritten data, "whiteboa" (rightmost coordinates of "a"), and the frame 402 in the handwriting direction (right direction).

When the space is less than a size corresponding to a single character, the drawing object processing unit 308 expands the frame 402 in the handwriting direction to make the space have the size corresponding to at least a single character. The size corresponding to a single character is determined according to the stroke data or one of the one or more characters that is already input as handwriting input in the frame 402.

Figure 6:
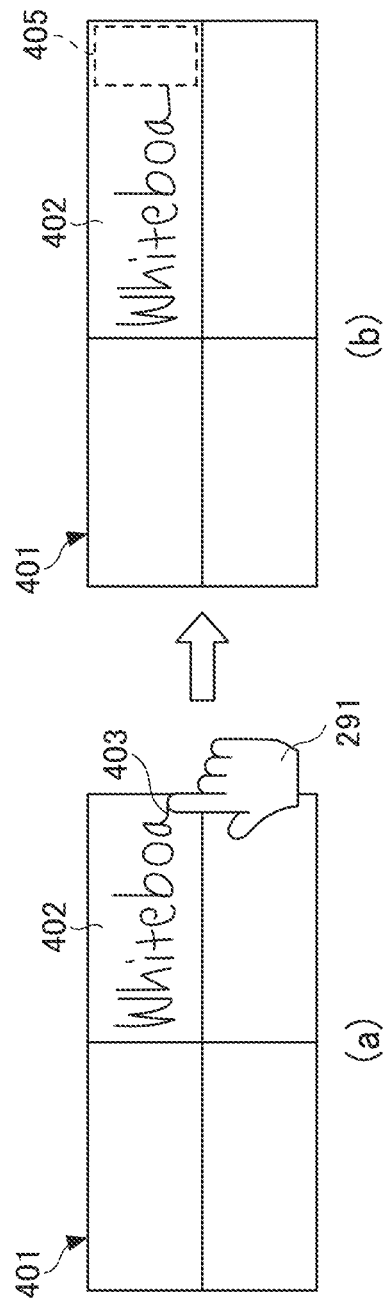
FIG. 6 is a diagram illustrating how the frame is expanded, according to the first embodiment.

In (b) of FIG. 6, the frame 402 that is expanded is illustrated. The space 405 is generated to the right of the handwritten data. The expanding of the frame 402 results in the space 405 that is a sum of the space determined to be less than a size corresponding to a single character and a space corresponding to the character size, which is a size corresponding to a single character. This allows the user to continue handwriting input to write one or more subsequent characters in the space 405.

The handwriting direction is determined based on a circumscribed rectangle of the entire handwritten data ("whiteboa"). The drawing object processing unit 308 determines that handwriting is a horizontal writing when the aspect ratio of the circumscribed rectangle of the entire handwritten data in the frame indicates laterally long, and determines that the handwriting direction is a vertical writing when the aspect ratio indicates vertically long. Alternatively, the drawing object processing unit 308 may monitor a width and a height of the entire handwritten data in the frame and determine a direction in which the change is larger as the handwriting direction.

The determination of the handwriting direction, from right to left, from left to right, from up to down, or from down to up, may be made according to increment in the coordinates of the handwritten data.

Figure 7:
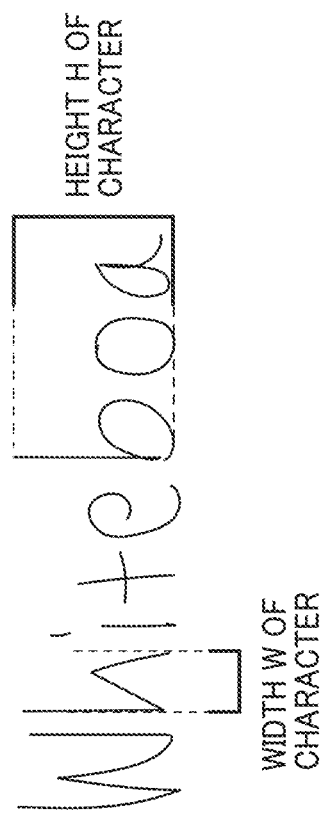
FIG. 7 is a diagram illustrating how a character size, which is a size corresponding to a single character, is determined, according to the first embodiment.

FIG. 7 is a diagram illustrating a method of determining a character size, which is a size corresponding to a single character, according to the present embodiment. The character size calculation unit 307 determines the largest width and the largest height in the stroke data already input as the handwriting input as a width and a height of the character size, which is a size corresponding to a single character. In other words, the character size calculation unit 307 obtains a circumscribed rectangle of each of strokes represented by the stroke data and extracts the maximum width and the maximum height. When expanding the frame 402 in the horizontal direction, the drawing object processing unit 308 expands the frame 402 by at least the maximum width to the right. When the frame 402 is expanded in a downward direction that is a direction perpendicular to the handwriting direction, the drawing object processing unit 308 expands the frame 402 by at least the maximum height. Note that the drawing, object processing unit 308 may adopt a minimum value, an average value, or a median value in alternative to a maximum value.

In addition, the character size calculation unit 307 may focus on a single character in alternative to a single stroke represented by the stroke data. For example, the drawing object processing unit 308 converts handwritten data info characters in real time by OCR processing. The character size calculation unit 307 obtains a circumscribed rectangle of each character and extracts the maximum width and the maximum height. The character size calculation unit 307 sets the maximum width or the maximum height of a corresponding character as the character size, which is a size corresponding to a single character. Although various algorithms have been proposed for the recognition method, a detailed description is omitted on the assumption that known techniques can be used in the present embodiment.

Figure 8:
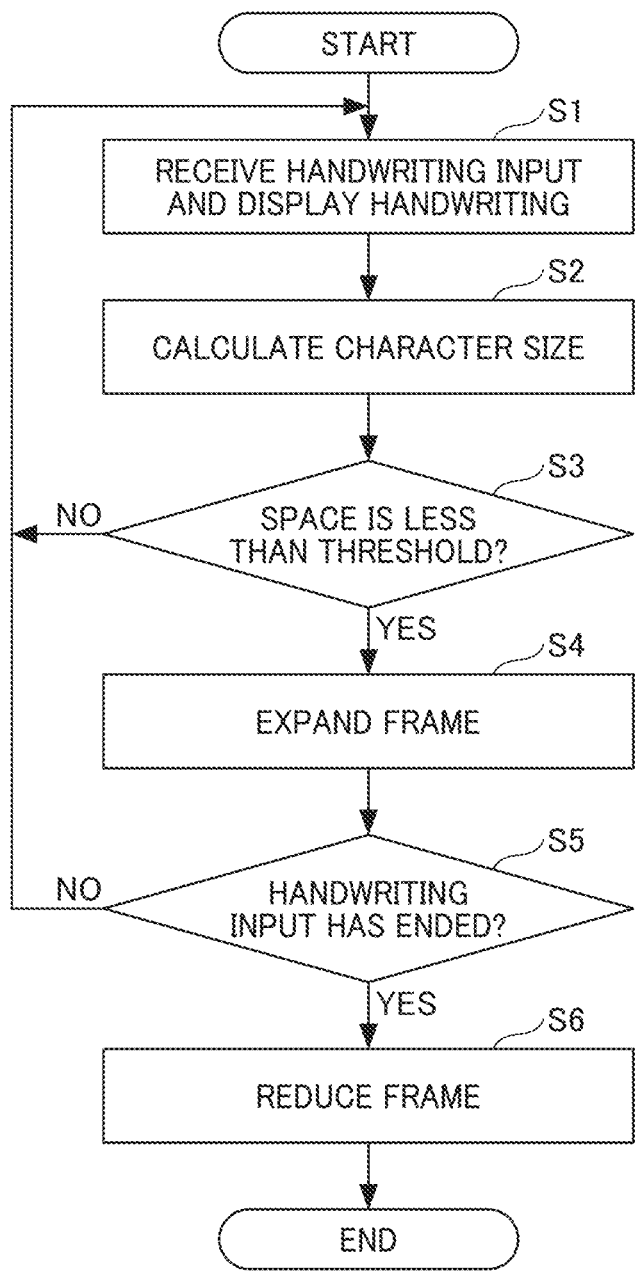
FIG. 8 is a flowchart illustrating a process, performed by the display apparatus, of expanding the frame according to handwritten data input as handwriting input in the frame, according to the first embodiment.

Process of Expanding Frame:

FIG. 8 is a flowchart illustrating a process, performed by the display apparatus 2, of expanding the frame 402 according to the handwritten data input as the handwriting input within the frame 402, according to the present embodiment. With respect to the flowchart, it is assumed that the handwriting input is performed in an area surrounded by the frame 402, such as a table or a figure. In a case where the handwriting is not performed in the area surrounded by the frame 402, the display apparatus 2 may not perform the process of the flowchart. Alternatively, the display apparatus 2 may obtain "NO" as a determination result in step S3, which is described later, so that the subsequent processing is not performed.

When the handwriting input is performed according to a user operation, a coordinate detection unit 302 detects coordinates touched by the input device 291. The event classification unit 303 determines that an event corresponding to the handwriting input as a stroke drawing event based on a coordinate point sequence corresponding to the coordinates, and the stroke processing unit 306 displays one or more strokes on the display (S1).

When the tip of the input device 291 is separated from the display according to a user operation, the character size calculation unit 307 calculates, or obtains, the character size that is a size corresponding; to a single character (S2).

Note that a time when the character size calculation unit 307 calculates the character size, which is a size corresponding to a single character may not be the time at which the tip of the input device 291 is separated from the display. The character size calculation unit 307 may calculate the character size, which is a size corresponding to a single character, in real time while the handwriting input is being performed according to the user operation.

Next, the drawing object processing unit 308 determines whether there is space for a character to be written next in the frame 402 (S3). In the present embodiment, the character size, which is a size corresponding to a single character, calculated at step S2 is used as a threshold by the drawing object processing unit 308 to determine whether there is space or not. When space between the right end of the rightmost character of the handwriting input and the right side of the frame 402 is less than the character size, the drawing object processing unit 308 determines that there is not enough space (absence of the space).

Note that the threshold value with which the drawing object processing unit 308 determines the presence or absence of the space does not need to match the character size, which is a size corresponding to a single character, and a value obtained by adding a margin to the character size, which is a size corresponding to a single character may be used. By adding a margin to the character size, the space having a size larger than the character size is obtainable by the drawing object processing unit 308. The margin may be a fixed value or may be determined by the drawing object processing unit 308 in accordance with the character size by adapting 10% of the character size, for example.

In some embodiments, a size corresponding to two or more characters may be used as the threshold value for determining the presence or absence of the space. By using the size corresponding to two or more characters as the threshold value, a space corresponding to more than two characters is obtainable, and this allows the user to concentrate on inputting handwriting. In some embodiments, the threshold value used by the drawing object processing unit 308 to determine the presence or absence of the space may be set by user (for example, a size corresponding to a single character, a size corresponding to two characters).

In the present embodiment, since the handwriting direction is from left to right, the space at the right end is used for the determination, in case that the handwriting direction is from right to left, the space at the left end may be used for the determination. Similarly, in case that the handwriting direction is from top to bottom, the space at the bottom may be used for the determination. In case that the handwriting direction is from bottom to top, the space at the top may be used for the determination.

Figure 9:
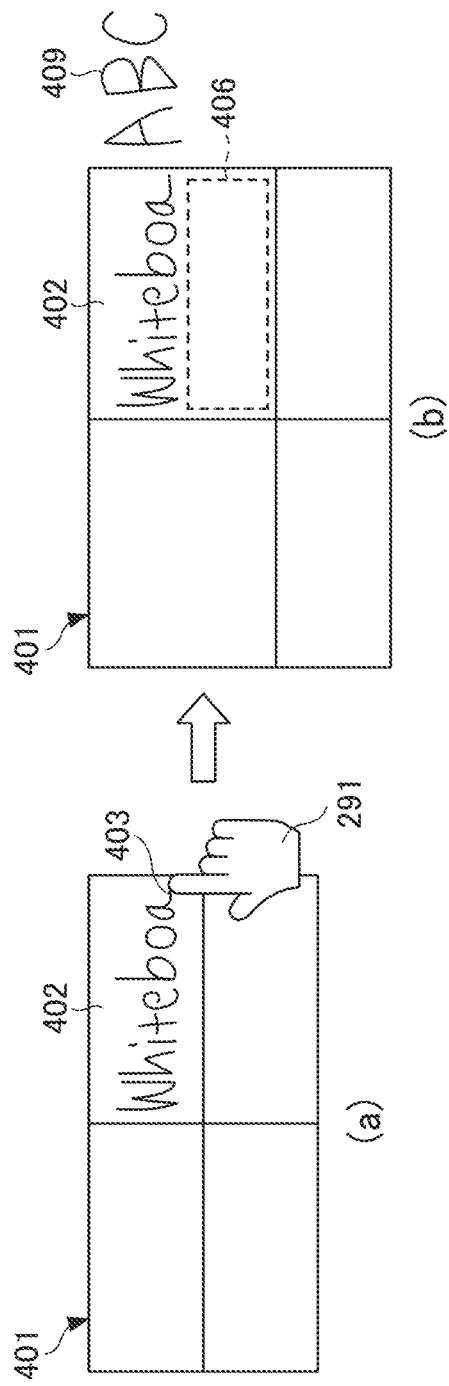
FIG. 9 is a diagram illustrating a case that a down side of the frame is expanded, according to the first embodiment.

In case that the handwriting direction is from right to left, namely the handwriting input is performed in a right direction, if there is another piece of handwritten data in the right direction, the drawing object processing unit 308 may perform the expanding to down (see FIG. 9). Since the coordinates of each drawing object are stored in the page data storage unit 311, the drawing object processing unit 308 determines whether the circumscribed rectangle of the drawing object and the frame overlap each other, in this case, the lower end space is also used for the determination of the presence or absence of the space in step S3, in addition to the space at the right end if the space is enough for one or more characters, the expanding does not need to be performed.

If the space at the right end is larger than the threshold value in step S3, the drawing object processing unit 308 returns to step S1.

When the space at the right end is equal to or less than the threshold value in step S3, the drawing object processing unit 308 expands the frame 402 (S4). The expanding of the frame 402 means making space for at least a single character to the right in the area of the frame 402. In the case of a table, the drawing object processing unit 308 make the space by increasing the width of a column. In the case of a graphic, the drawing object processing unit 308 make the space by increasing the horizontal width of the graphic.

Note that the drawing object processing unit 308 may take into account space that is currently left and expand the frame to make the space have enough size for a single character. In other words, a size corresponding to a single character may be enough as the space obtained after expanding the frame. In the case of taking into account the space that is currently left, the drawing object processing, unit 308 subtracts a size corresponding to the space currently left from the character size calculated at S2 to obtain a value and expands the frame based on the obtained value.

In addition, the drawing object processing unit 308 may expand the frame 402 so as to obtain a space for two or three characters instead of a single character. By obtaining a space for two or more characters, the frequency of expanding, the frame 402 is reduced, and the load on the display apparatus 2 may be reduced accordingly. In addition, since the size of the frame 302 does not change frequently when viewed from the user, the user may concentrate on handwriting more. The user may set a size to which the drawing object processing unit 308 extends at a time (for example, a size corresponding to a single character, a size corresponding to two characters).

Subsequently, the drawing object processing unit 308 determine whether the handwriting, input according to a user operation is ended (S5). For example, when a certain period of time has elapsed since the latest handwriting input, the drawing object processing unit 308 determines that the handwriting input has ended. The-above determination method is an example. In some embodiments, the display apparatus 2 may enter a writing mode that is one of the modes, and when the display apparatus 2 switches the mode from the writing mode to another mode in response to a user operation such as pressing a button, the drawing object processing unit 308 determines that the handwriting input has ended.

When it is determined, at step S5, that the handwriting input is continued, the process returns to step S1, and the display apparatus 2 repeats the process.

When a determination result obtained at step S5 indicates that the handwriting input has ended, the drawing object processing unit 308 reduces the frame 402 expanded in step S4 to restore the frame to the size frame before the expansion (S6). That is, the drawing object processing unit 308 reduces the frame 402 in a direction opposite to the handwriting direction by a size corresponding to the expansion performed at the step S4. As a result, the space at the right end automatically created by the expansion of the frame 402 is cancelled so that a redundant space does not remain, resulting n making the frame 402 have an appropriate site for a character string corresponding to the handwriting input.

Expanding Down Side of Frame:

As illustrated in FIG. 9, the drawing object processing unit 308 may expand a down side of the frame 402 in alternative to the right side of frame 402 so as to generate space (in a downward direction that is a direction perpendicular to the handwriting direction). FIG. 9 is a diagram illustrating a case that the down side of the frame is expanded, according to the present embodiment.

(a) of FIG. 9 a is the same as (a) of FIG. 6. There is almost no space between the right end of the handwriting represented by the handwritten data, "whiteboa," and the frame 402 in the handwriting direction (right direction).

There is a case in which the drawing object processing unit 308 fails to generate space to the right of the handwritten data. For example, another object represented by handwritten data 409 or another character string may have already been displayed. The coordinates of the handwritten data 409 are stored in the page data storage unit 311.

In such a case, the drawing object processing unit 308 expands the frame 402 so that a space having a height corresponding to at least a single character is generated under the handwriting represented by the handwritten data. In other words, the drawing object processing unit 308 increases the height of the frame 402 by at least a single character by expanding the frame 402 to down. The drawing object processing unit 308 identifies the lowermost coordinates of the stroke data in the frame, and extends the frame 402 by a value corresponding to a height of at least a single character from the specified coordinates. For example, in a case where the lower end of "t" of "Whiteboa" indicates the lowermost coordinates of the stroke data, the drawing object processing unit 308 expands the frame by the value corresponding to a height of at least a single character with respect to the lower end of "t".

In (b) of FIG. 9, a space 406 is generated wider the handwriting represented by the handwritten data. This allows the user to continue handwriting input to write one or more subsequent characters in the space 406, which is under the handwriting represented by the handwritten data.

Figure 10:
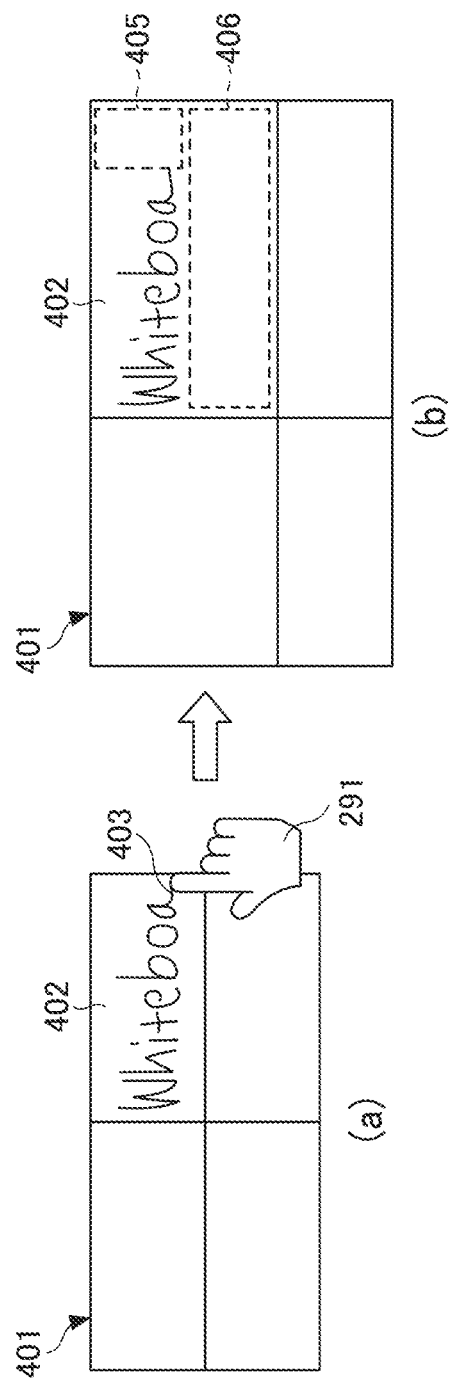
FIG. 10 is a diagram illustrating expanding a right side and the down side of the frame, according to the first embodiment.

As illustrated in FIG. 10, the drawing object processing unit 308 may expand the frame 402 so as to generate a space to the right of the area of the frame 402 and another space under the frame 402 (in the downward direction, which is a direction perpendicular to the handwriting direction). FIG. 10 is a diagram illustrating expanding the right side and the down side of the frame, according to the present embodiment.

(a) of FIG. 10 is the same as (a) of FIG. 6. There is almost no space between the right end of the handwriting represented by the handwritten data, "whiteboa," and the frame 402 in the handwriting direction (right direction).

The drawing object processing unit 308 expands the frame 402 so that a space having a size corresponding to at least a single character is generated to the right and under the handwriting represented by the handwritten data. In other words, the drawing object processing unit 308 increases the width and the height (height of row) of the frame 402 by at least a single character.

(b) FIG. 10, the space 405 is generated to the right to the handwriting represented by the handwritten data, and the space 406 is generated under the handwriting represented by the handwritten data. This allows the user to continue handwriting input to write one or more subsequent: characters in the space 405, which is in the right area, or the space 406, which is the down area.

Such a method as illustrated in FIG. 10 may cope with a case where the user desires to start a new line to perform handwriting input. When the user performs handwriting input only in the right direction, the drawing object processing unit 308 may delete the space corresponding to the down area after the handwriting input is completed.

Figure 11:
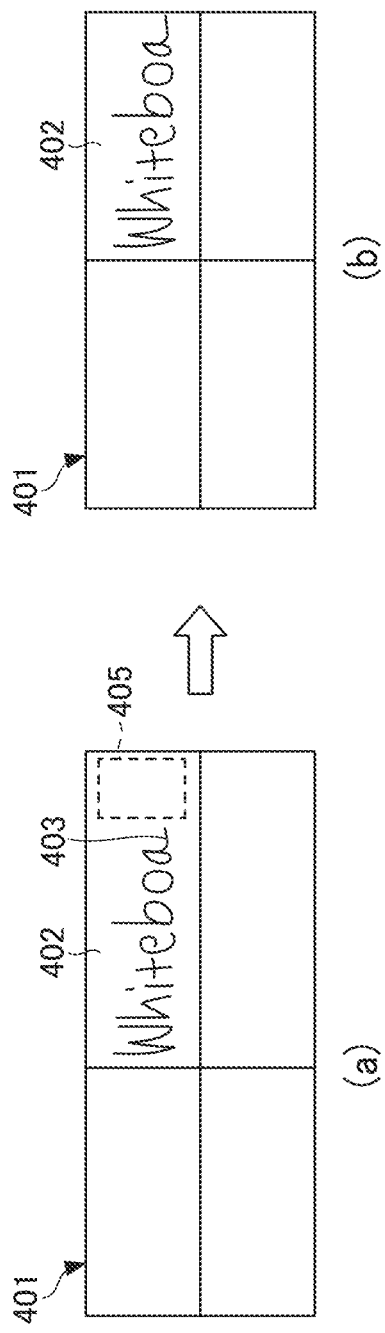
FIG. 11 is a diagram illustrating cancelling a space after handwriting input is completed, according to the first embodiment.

Deletion of Space After Completion of Handwriting Input:

FIG. 11 is a diagram illustrating cancelling a space after handwriting input is completed, according to the present embodiment. When a determination result indicates that the handwriting input has ended, the drawing object processing unit 308 restores the frame 402, which has been expanded, to the size as before the expansion of the frame 402.

In (a) of FIG. 11, the frame 402 is expanded. In (b) of FIG. 11, the frame 402 is reduced to a size same as the one before the expansion. In this way, the size of the frame 402 is set to an appropriate size in which the handwriting represented by the handwritten data is fit.

Note that the drawing object processing unit 308 may reduce the frame 402 to a size in which the handwriting represented by the handwritten data fits regardless of whether the frame has been expanded, or regardless of an amount (a degree, or a size) of expansion of the frame 402. In this case, the drawing object processing unit 308 may reduce the frame 402 to the right of the handwriting represented by the handwritten data.

In addition, in a case where the size of the frame 402 is reduced so that the handwriting represented by the handwritten data is fit in as illustrated in b) of FIG. 11B, the user may expand the frame using a expand button described later in a second embodiment.

In addition, as described with reference to FIG. 9, instead of automatically reducing the expanded frame 402 by the drawing object processing unit 308, the frame 402 may be reduced by pressing a reduce button described later in the second embodiment. In this case, the space remains at the right end, and this allows the user to additionally perform handwriting input to the space left.

The display apparatus 2 according to the present embodiment expands the frame 402 to obtain a space having a size corresponding to at least a single character when the space at the right end becomes less than the character size, and this allows the user to input a next character to the space which has a size larger than the character size, which is a size corresponding to a single character.

Second Embodiment

The display apparatus 2 according to a second embodiment expands the frame 402 when a user presses an expand button 410 with respect to the frame 402.

In the present embodiment, the block diagram of FIG. 4 illustrating the hardware configuration and the block diagram of FIG. 5 illustrating the functional configuration described in the above embodiment are applicable.

Figure 12:
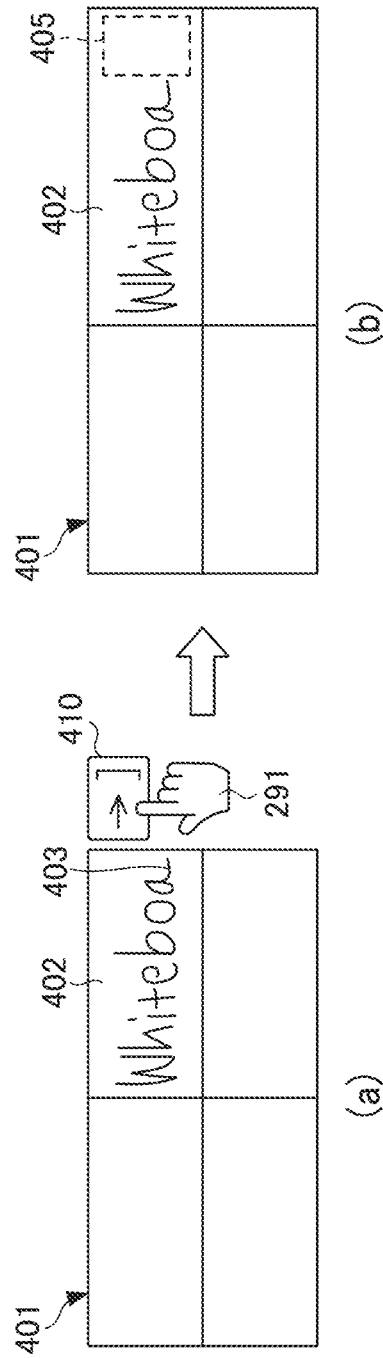
FIG. 12 is a diagram illustrating a frame that is expanded in response to a expand button being pressed, according to a second embodiment.

Example of Expand Button:

FIG. 12 is a diagram illustrating the frame 402 that is expanded in response to pressing of the expand button 410. (a) of FIG. 12 is the same as (a) of FIG. 6. When the space at the right end becomes less than the character size, the UI image generation unit 309 according to the present embodiment displays the expand button 410. Then, when the expand button 410 is pressed, the drawing object processing unit 308 expands the right side of the frame 402 so that a space is generated to the right of the handwriting represented by the handwritten data (see (b) of FIG. 12). The method of expanding may be substantially the same as that of the first embodiment.

Since the frame 402 is expanded in response to the expand button 410 being pressed, the frame 402 is expanded by reflecting intention of the user.

The UI image generation unit 309 may display one or both of the expand button 410 for expanding the frame in the right direction and the expand button 410 for expanding the frame in the down direction.

Figure 13:
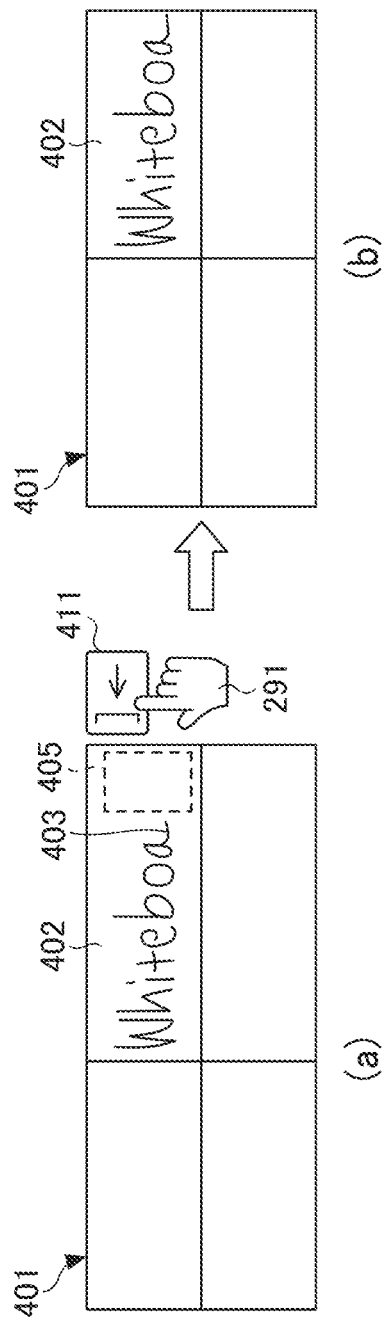
FIG. 13 is a diagram illustrating the frame that is reduced in size in response to a reduce button being pressed, according to the second embodiment.

As illustrated in FIG. 13, the drawing object processing unit 308 may reduce the frame 402 in response to a reduce button 411 being pressed.

FIG. 13 is a diagram illustrating the frame 402 that is reduced, in size in response to the reduce button 411 being pressed. A state of the frame 402 in (a) of FIG. 13 is the same as (b) of FIG. 12, and the space 405 is generated to the right of the handwritten data.

When the frame 402 is expanded, the UI image generation unit 309 according to the present embodiment displays the reduce button 411. Then, when the reduce button 411 is pressed, the drawing object processing unit 308 reduces the frame 402 to the size before the expansion. The method of reducing in a size may be the same as that of the first embodiment.

When the frame 402 is expanded in the downward direction, the UI image generation unit 309 may display a reduce button 411 for cancelling the expansion in the downward direction to restore the frame to the original state. The UI image generation unit 309 may display both of the reduce button 411 for cancelling the expansion in the right direction and the reduce button 411 for cancelling the expansion in the downward direction. In other words, the reduce button 411 is used to delete the space left.

Figure 14:
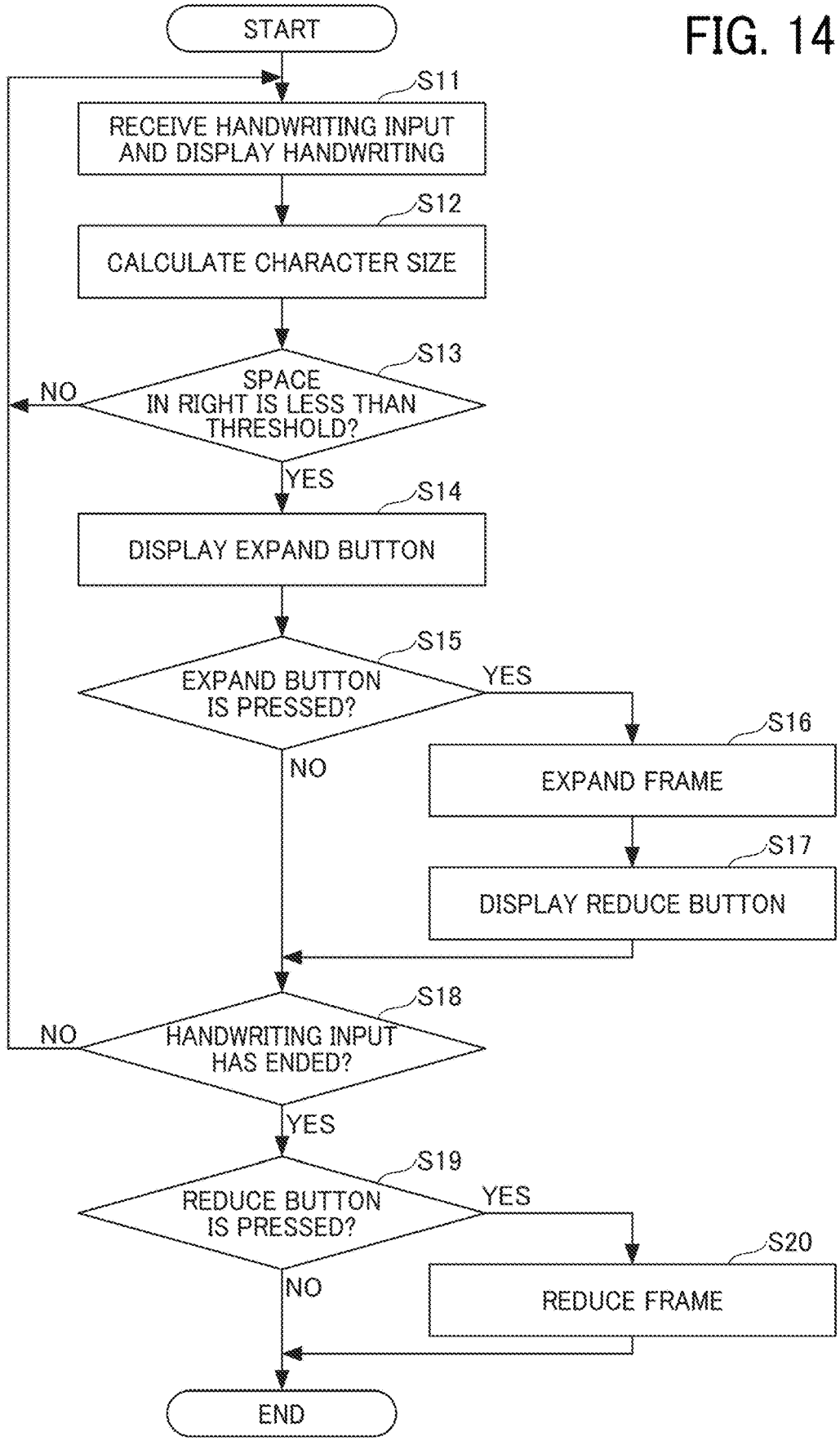
FIG. 14 is a flowchart illustrating a process, performed by a display apparatus, of expanding the frame in response to receiving a user operation of pressing, the expand button, according to the second embodiment.

Process of Expanding Frame:

FIG. 14 is a flowchart illustrating a process, performed by the display apparatus 2, of expanding the frame 402 in response to receiving a user operation of pressing the expand button 410, according to the present embodiment. In the following description of FIG. 14, differences from FIG. 8 are described.

Processing of steps S11, S12, and S13 is substantially the same as that of steps S1, S2, and S3 in FIG. 8, respectively.

When a determination result obtained in step S13 indicates that the space in the frame 402 is equal to or less than the threshold value, the UI image generation unit 309 displays an expand button 410 for expanding the frame 402 (S14).

The drawing object processing unit 308 determines whether the expand button 410 has been pressed according to a user operation (S15). Since the coordinates of contact of the input device 291 detected by the coordinate detection unit 302 are superimposed on the expand button 410, the event classification unit 303 classifies the event as a UI operation event to be distribute to the operation processing unit 304. Since the expand button 410 has been pressed, the operation processing unit 304 requests the drawing object processing unit 308 to expand the frame 402.

When a determination result obtained in step S15 indicates that the expand button 410 has been pressed, the drawing object processing unit 308 expands the frame 402 (S16). The process of expanding the frame 402 in the step S16 may be substantially the same as that in step S4 of FIG. 8. The drawing object processing unit 308 may expand the frame 402 in the right direction (handwriting direction or may expand the frame 402 in the downward direction (downward direction that is a direction perpendicular to the handwriting direction) in addition to or in alternative to the right direction.

The UI generation unit 309 hides the expand button 410 and displays the reduce button 411 for reducing the frame 402 (S17).

A method to determine whether the handwriting input according to a user operation has ended or not in step S18 may be substantially the same as that in step S5 of FIG. 8. When a determination result obtained in step S15 that handwriting input is continuing, the process returns to step S11 to continue the process.

When a determination result obtained in step S18 indicates that the handwriting input has ended, the drawing object processing unit 308 determines whether the reduce button 411 for reducing the frame 402 is pressed according to a user operation or not (S19). Since the coordinates of contact of the input device 291 detected by the coordinate detection unit 302 are superimposed on the reduce button 411, the event classification unit 303 classifies the event as a UI operation event to be distribute to the operation processing unit 304. Since the reduce button 411 has been pressed, the operation processing unit 304 requests the drawing object processing unit 308 to reduce the frame 402.

When a determination result obtained in step S19 indicates that the reduce button 411 has not been pressed, the drawing object processing unit 308 ends the process without doing anything. In this case, the reduce button 411 may remain to be displayed or may be hidden after a certain period of time has passed.

When a determination result obtained in step S19 indicates that the reduce button 411 has been pressed, the drawing object processing, unit 308 performs reduction processing of the frame 402 (S20). The process of reducing the frame 402 in step S20 is similar to the process in step S6 of FIG. 8, and may be a process of restoring the frame 402 to the site before the expansion of S16, or deleting the space left.

In FIG. 14, in order to illustrate the processing flow, the determination whether the expand button 410 is pressed and the determination whether the reduce button 411 is pressed are made at step S15 and step S19, respectively. However, the drawing object processing unit 308 may asynchronously determine whether the user has pressed the expand button 410 or the reduce button 411, and may immediately expand or reduce the frame 402 at a timing of the pressing.

The display apparatus 2 according to the present embodiment expands a frame in response to receiving a user operation of pressing the expand button 410 or reduce the frame to restore the frame to the size before the expansion in response to receiving a user operation of pressing the reduce button 411.

Third Embodiment

A configuration of a display system, which performs one or more of the above-described processes, according to a third embodiment, is described below.

First Example of Configuration of Display System:

Although the display apparatus 2 according to the present embodiment is described as that having a large touch panel, the display apparatus 2 is not limited thereto.

Figure 15:
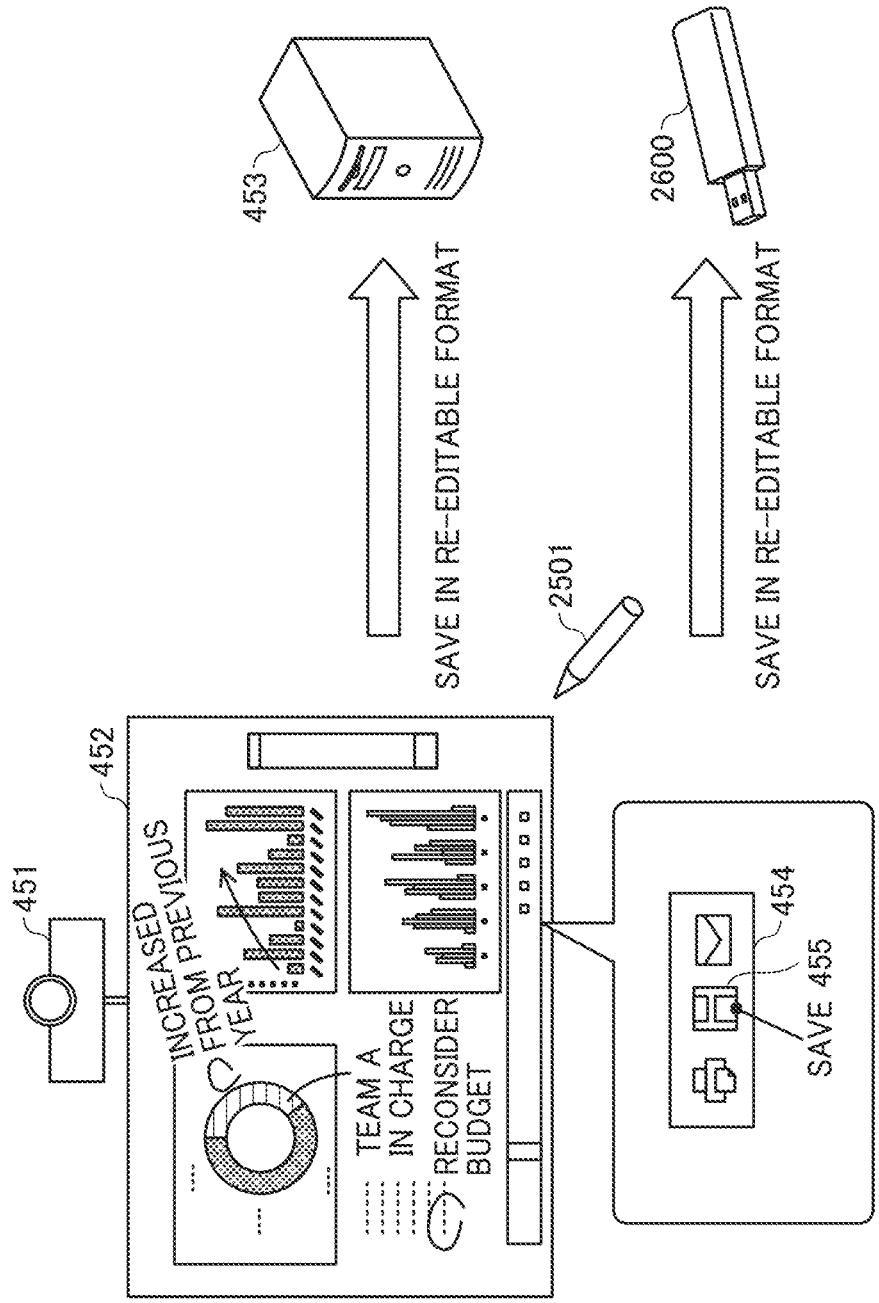
FIG. 15 is a diagram illustrating a configuration of a display system according to a third embodiment.

FIG. 15 is a diagram illustrating at configuration of a display system according to the present embodiment. The display system includes a projector 451, a whiteboard 452, and a server 453, and the projector 451 and the server 453 are communicably connected to each other via a network. In the example of FIG. 15, the projector 451 is installed on the upper face of the whiteboard 452, which is a general whiteboard (standard whiteboard). The projector 451 serves as the display apparatus 2 described above. In other words, the projector 451 is a general-purpose projector, but installed with software that causes the projector 451 to function as the each function of the display apparatus 2 as illustrated in FIG. 5. The server 453 or an external memory, such as a USB memory 2600, may serve as a function corresponding to the storage function of the display apparatus 2. The "standard whiteboard" (the whiteboard 452) is not a flat panel display integral with a touch panel, but is a whiteboard to which a user directly handwrites information with a marker. Note that the whiteboard may be a blackboard, and may be simply a plane having an area large enough to project an image.

The projector 451 employs an ultra short-throw optical system and projects an image (video) with reduced distortion from a distance of about 10 cm to the whiteboard 452. This video may be transmitted from a PC connected wirelessly or by wire, or may be stored in the projector 451.

The user performs handwriting on the whiteboard 452 using a dedicated electronic pen 2501. The electronic pen 2501 includes a light-emitting element, for example, at a tip thereof. When a user presses the electronic pen 2501 against the whiteboard 452 for handwriting, a switch is turned on, and the light-emitting portion emits light. The wavelength of light of the light-emitting element is near-infrared or infrared that is invisible to a user. The projector 451 includes a camera. The projector 451 captures, with the camera, an image of the light-emitting element, analyzes the image, and determines the direction of the electronic pen 2501. Thus, the contact detection unit 301 (illustrated in FIG. 5), implemented by the camera, receives the light as the signal indicating that the electronic pen 2501 is pressed against the whiteboard 452. Further, the electronic pen 2501 emits a sound wave in addition to the light, and the projector 451 calculates a distance based on an arrival time of the sound wave. The projector 451 determines the position of the electronic pen 2501 based on the direction and the distance. Handwritten data is drawn (projected) at the position of the electronic pen 2501.

The projector 451 projects a menu 454. When the user presses a button of the menu 454 with the electronic pen 2501, the projector 451 determines the pressed button based on the position of the electronic pen 2501 and the ON signal of the switch. For example, when a save button 455 is pressed, handwritten data (coordinate point sequence) input by the user is saved in the projector 451. The projector 451 stores the handwritten information in a predetermined server 453, the USB memory 2600, or the like. Handwritten information is stored for each page. Because being stored as coordinates instead of image data, the handwritten information is re-editable according to a user operation. However, in the present embodiment, an operation command can be called by handwriting, and the menu 454 does not have to be displayed.

Fourth Embodiment

Figure 16:
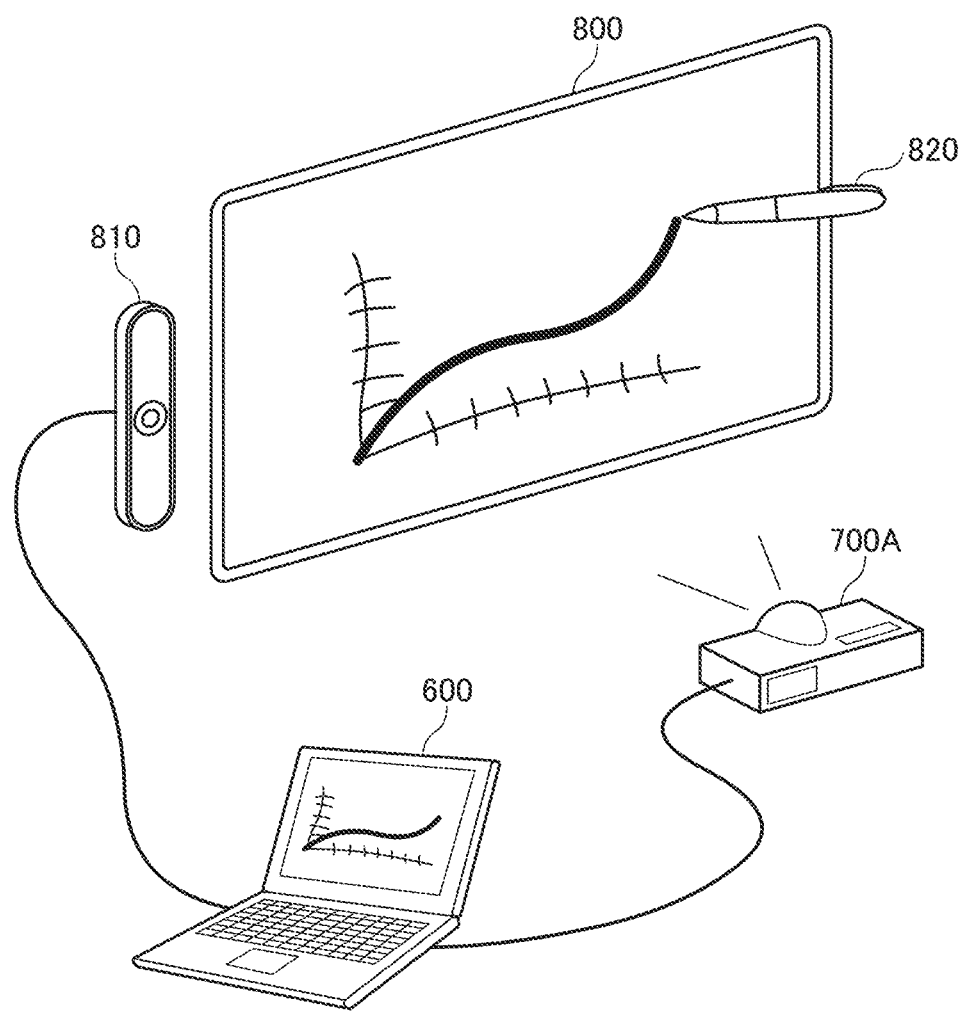
FIG. 16 is a diagram illustrating a configuration of a display system according to a fourth embodiment.

Second Example of Configuration of Display System:

FIG. 16 is a diagram illustrating an example of the configuration of the display system according to a fourth embodiment. In the example illustrated FIG. 16, the display system includes a terminal device 600 (e.g., a PC), an image projection device 700A, and a pen motion detection device 810.

The terminal device 600 is coupled to the image projection device 700A and the pen motion detection device 810 by wire. The image projection device 700A projects image data input from the terminal device 600 onto a screen 800.

The pen motion detection device 810 communicates with an electronic pen 820 to detect a motion of the electronic pen 820 in the vicinity of the screen 800. More specifically, the pen motion detection device 810 detects coordinate information indicating a position pointed by the electronic pen 820 on the screen 800 and transmits the coordinate information to the device apparatus 600. The method of detecting is substantially the same as one described with reference to FIG. 15. A function corresponding to the contact detection unit 301 (illustrated in FIG. 5) of the display apparatus 2, is implemented by the electronic pen 820 and the pen motion detection device 810. Other functions corresponding to the functional units other than the contact detection unit 301 of the display apparatus 2 are implemented by the terminal device 600. In other words, the terminal device 600 is a general-purpose computer, and installed with software that causes the terminal device 600 to function as the function units, except for the contact detection unit 301 of the display apparatus 2 as illustrated in FIG. 5. In addition, a function corresponding to the display unit 312 is implemented by the terminal device 600 and the image projection device 700A.

Based on the coordinate information received from the pen motion detection device 810, the terminal device 600 generates image data (handwritten data) of handwriting input by the electronic pen 820 and causes the image protection device 700A to project the handwritten data on the screen 800.

The terminal device 600 generates data of a superimposed image in which an image based on the handwritten data input by the electronic pen 820 is superimposed on the background image projected by the image projection device 700A.

Fifth Embodiment

Figure 17:
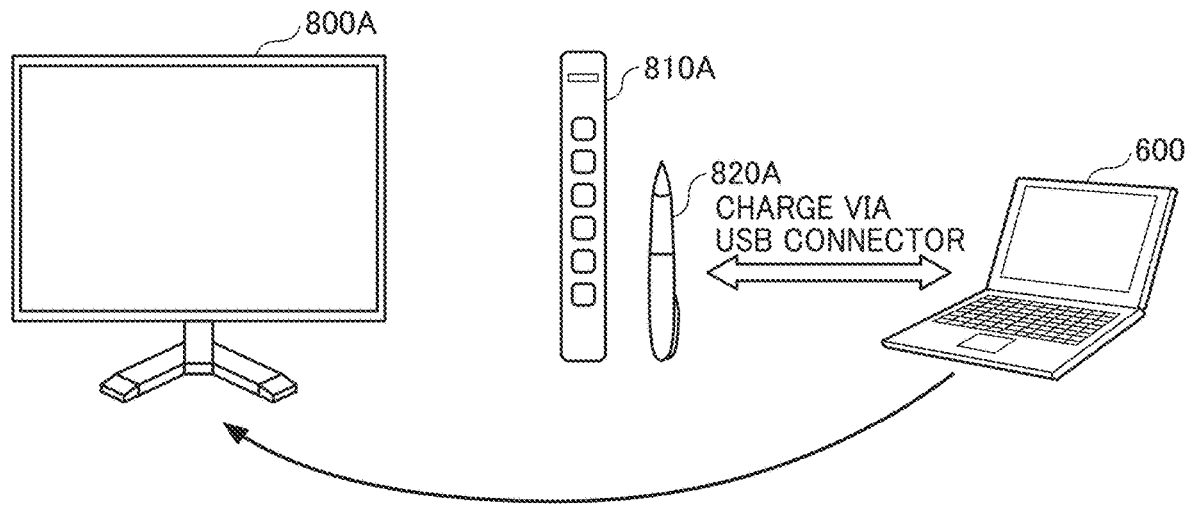
FIG. 17 is a diagram illustrating a configuration of a display system according to a filth embodiment.

Third Example of Configuration of Display System:

FIG. 17 is a diagram illustrating a configuration of a display system according to a fifth embodiment. In the example of FIG. 17, the display system includes a terminal device 600, a display 800A, and a pen motion detection device 810A.

The pen motion detection device 810A, which is disposed in the vicinity of the display 800A, detects coordinate information indicating a position pointed by an electronic pen 820A on the display 800A and transmits the coordinate information to the terminal device 600. The method of detecting is substantially the same as one described with reference to FIG. 15. In the example of FIG. 17, the electronic pen 820A can be charged from the terminal device 600 via a USB connector. A function corresponding to the contact detection unit 301 (illustrated in FIG. 5) of the display apparatus 2, is implemented by the electronic pen 820A and the pen motion detection device 810A. Other functions corresponding to the functional units other than the contact position detection unit 301 of the display apparatus 2 are implemented by the terminal device 600. In other words, the terminal device 600 is a general-purpose computer, and installed with software that causes the terminal device 600 to function as the function units, except for the contact detection unit 301, of the display apparatus 2 as illustrated in FIG. 5. In addition, a function corresponding to the display unit 312 is implemented by the terminal device 600 and the display 800A.

Based on the coordinate information received from the pen motion detection device 810, the terminal device 600 generates image data of handwritten data input by the electronic pen 820A and displays an image based on the handwritten data on the display 800A.

Sixth Embodiment

Figure 18:
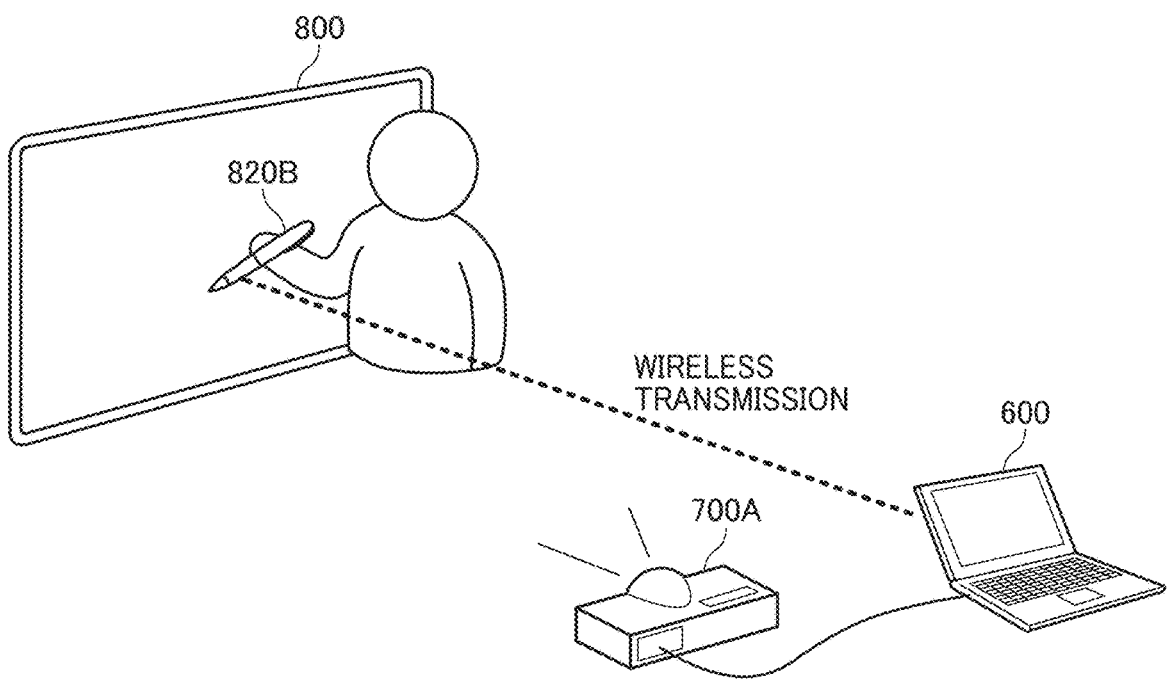
FIG. 18 is a diagram illustrating a configuration of a display system according to a sixth embodiment.

Fourth Example of Configuration of Display System:

FIG. 18 is a diagram illustrating a configuration of a display system according to a sixth embodiment. In the example illustrated. FIG. 18, the display system includes a terminal device 600 and an image projection device 700A.

The terminal device 600 communicates with an electronic pen 820B through by wireless communication such as BLUETOOTH, to receive coordinate information indicating a position pointed by the electronic pen 820B on a screen 800. The electronic pen 820B may read minute position information on the screen 800, or receive the coordinate information from the screen 800.

Based on the received coordinate information, the terminal device 600 generates image data (handwritten data) of handwriting input by the electronic pen 820B, and causes the image projection device 700A to project an image based on the handwritten data.

The terminal device 600 generates data of a superimposed image in which an image based on the handwritten data input by the electronic pen 820B is superimposed on the background image projected by the image projection device 700A. A function corresponding to the contact detection unit 301 (illustrated in FIG. 5) of the display apparatus 2, is implemented by the electronic pen 820B and the terminal device 600. Other functions corresponding to the functional units other than the contact detection unit 301 of the display apparatus 2 are implemented by the terminal device 600. In other words, the terminal device 600 is a general-purpose computer, and installed with software that causes the terminal device 600 to function as the function units of the display apparatus 2 as illustrated in FIG. 5. In addition, a function corresponding to the display unit 312 is implemented by the terminal device 600 and the image projection device 700A.

The embodiments described above are applied to various system configurations.

Variation:

The above-described embodiments are illustrative and do not limit the present disclosure. Thus, numerous additional modifications and variations are possible in light of the above teachings within the scope of the present disclosure. For example, elements and/or features of different illustrative embodiments may be combined with each other and/or substituted for each other within the scope of the present invention. Any one of the above-described operations may be performed in various other ways, for example, in an order different from the one described above.

Although input of handwritten data has been mainly described in the embodiment described above, the drawing object processing unit 308 performs character recognition of handwritten data. The display apparatus 2 may determine the presence or absence of a space or may expand a frame at a time of performing character recognition.

In the above-described embodiment, the description concerns the display apparatus to be used as an electronic whiteboard. However, the display apparatus may be any device, for example, a digital signage, which displays an image. Instead of ae display apparatus, a projector may perform displaying. In this case the display apparatus 2 may detect the coordinates of the tip of the pen using ultrasonic waves, although the coordinates of the tip of the pen are detected using the touch panel in the above-described embodiment. The pen emits an ultrasonic wave in addition to the light, and the display apparatus 2 calculates a distance based on an arrival time of the sound wave. The position of the pen can be identified by the direction and the distance. The projector draws (projects) the trajectory of the pen as a stroke.

In alternative to the electronic whiteboard described above, the present disclosure is applicable to any information processing apparatus with a touch panel. An apparatus having capabilities similar to that of an electronic whiteboard is also called an electronic information board or an interactive board. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a laptop computer, a mobile phone, a smartphone, a tablet terminal, a game console, a personal digital assistant (PDA), a wearable PC, and a desktop PC.

In the block diagram such as FIG. 5, functional units are divided into blocks in accordance with main functions of the display apparatus 2, in order to facilitate understanding the operation by the display apparatus 2. Each processing unit or each specific name of the processing unit is not to limit a scope of the present disclosure. A process implemented by the display apparatus 2 may be divided into a larger number of processes depending on the content of process. Also, one processing unit may be divided so as to include more processes.

Although characteristic functions of the above-described embodiment are provided by the display apparatus 2 alone in the description above, a server may provide at least a portion of the functions of the display apparatus 2. In this case, the display apparatus 2 and the server communicate with each other via a network. The display apparatus 2 displays the handwritten data and transmits the handwriting data to the server, and the server provides a character recognition function and a table function.

Further, in the present embodiment, even if a threshold value is exemplified as a comparison, the threshold value is not limited to the exemplified value. For this reason, in the present embodiment, regarding all of the threshold values, expressions "less than the threshold value" and "equal to or less than the threshold value" have an equivalent meaning, and expressions "greater than the threshold value" and "equal to or more than the threshold value" have an equivalent meaning. For example, the expression "less than the threshold value" when the threshold value is 11" has the same meaning as "less than or equal to the threshold value when the threshold value is 10." In addition, the expression "exceeding the threshold value" when the threshold value is 10 has the same meaning as the expression "equal to or greater than the threshold value" when the threshold value is 11.

Each of the functions of the described embodiments may be implemented by one or more processing circuits. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The stroke processing unit 306 is an example of a receiving unit. The character size calculation unit 307 is an example of a calculation unit. The drawing object processing unit 308 is an example of a control unit. The UI image generating unit 309 is an example of a display control unit.

With a conventional technique, a frame is not expanded or enlarged. Reducing the character size without changing a size of the frame may cause difficulty for a user to view the character string.

According to one or more embodiments of the disclosure, a display apparatus expands a frame so that text fits within the frame.

The invention claimed is:

1. A display apparatus, comprising:
circuitry configured to:
 receive a handwriting input within a frame of line displayed on a display, the handwriting input corresponding to a part of a character string including one or more characters;
 obtain, based on the handwriting input, a character size indicating a maximum width and a maximum height of the one or more characters in the character string;
 determine whether the character size is greater than a space size in a direction of the handwriting input, the space size being a size of a space currently being left between the handwriting input and a side of the frame in the direction of the handwriting input to receive another handwriting input; and
 expand, in a case that the character size is determined to be greater than the space size, the frame by at least a size corresponding to the character size in the direction of the handwriting input, wherein
in a case that the direction of the handwriting input corresponds to a width direction of the character string, the circuitry determines whether the character size is greater than the space size based on the maximum width indicated by the character size, and in a case that the direction of the handwriting input corresponds to a height direction of the character string, the circuitry determines whether the character size is greater than the space size based on the maximum height indicated by the character size.

2. The display apparatus of claim 1, wherein the maximum width and the maximum height of the character size are obtained according to one or more strokes of stroke data included in the handwriting input.

3. The display apparatus of claim 1, wherein the circuitry is further configured to perform character recognition on the handwriting input, and obtain the maximum width and the maximum height of a character included in the handwriting input as the character size.

4. The display apparatus of claim 1, wherein the circuitry is further configured to obtain the character size in response to detecting that contact corresponding to the handwriting input on the display ends.

5. The display apparatus of claim 1, wherein in response to completion of inputting the character string in the frame, the circuitry is further configured to delete space between an end of the character string in the handwriting direction and the side of the frame.

6. The display apparatus of claim 1, wherein in a case that an object in the direction of the handwriting input is present, the circuitry is further configured to expand the frame in a direction perpendicular to the direction of the handwriting input.

7. The display apparatus of claim 1, wherein the circuitry is further configured to expand the frame in the direction of the handwriting input and in a direction perpendicular to the direction of the handwriting input.

8. The display apparatus of claim 1, wherein the circuitry is further configured to display, on the display, a button for expanding the frame according to a result obtained based on comparison between the character size and the space left between the handwriting input and the side of frame in the direction of the handwriting input, and in response to receiving a user operation of pressing the button, expand the frame.

9. The display apparatus of claim 8, wherein the circuitry is further configured to display, on the display in a case that the circuitry expands the frame in response to the user operation of pressing the button, another button for reducing the frame to delete the space, and in response to receiving another user operation of pressing the another button, reduce the frame to delete the space.

10. The display apparatus of claim 1, wherein the circuitry is further configured to receive the another handwriting input, the another handwriting input corresponds to another part of the character string including the one or more characters, and the another part is subsequent to the part in the character string.

11. The display apparatus according to claim 1, wherein the circuitry is further configured to calculate a first size by subtracting the space size from the character size; and expand the frame by adding the first size to the space currently left between the handwriting input and the side of the frame in the direction of the handwriting input.

12. A display method, comprising:

receiving a handwriting input within a frame of line displayed on a display, the handwriting input corresponding to a part of a character string including one or more characters;

obtaining, based on the handwriting input, a character size indicating a maximum width and a maximum height of the one or more characters in the character string;

determining whether the character size is greater than a space size in a direction of the handwriting input, the space size being a size of a space currently being left between the handwriting input and a side of the frame in the direction of the handwriting input to receive another handwriting input; and expanding, in a case that the character size is determined to be greater than the space size, the frame by at least a size corresponding to the character size in the direction of the handwriting input, wherein in a case that the direction of the handwriting input corresponds to a width direction of the character string, the determining whether the character size is greater than the space size is based on the maximum width indicated by the character size, and in a case that the direction of the handwriting input corresponds to a height direction of the character string, the determining whether the character size is greater than the space size is based on the maximum height indicated by the character size.

13. The display method of claim 12, wherein the maximum width and the maximum height of the character size are obtained according to one or more strokes of stroke data included in the handwriting input.

14. The display method of claim 12, further comprising:

performing character recognition on the handwriting input; and obtaining the maximum width and the maximum height of a character included in the handwriting input as the character size.

15. The display method of claim 12, further comprising:

obtaining the character size in response to detecting that contact corresponding to the handwriting input on the display ends.

16. The display method of claim 12, further comprising:

in response to completion of inputting the character string in the frame, deleting space between an end of the character string in the handwriting direction and the side of the frame.

17. The display method of claim 12, further comprising:

in a case that an object in the direction of the handwriting input is present, expanding the frame in a direction perpendicular to the direction of the handwriting input.

18. The display method of claim 12, further comprising:

displaying, on the display, a button for expanding the frame according to a result obtained based on comparison between the character size and the space left between the handwriting input and the side of frame in the direction of the handwriting input; and in response to receiving a user operation of pressing the button, expanding the frame.

19. The display method of claim 12, further comprising:
receiving the another handwriting input, wherein
  the another handwriting input corresponds to another part of the character string including the one or more characters, and
  the another part is subsequent to the part in the character string.

20. A non-transitory recording medium storing a plurality of instructions which, when executed by one or more processors, cause the one or more processors to perform a process comprising:
  receiving a handwriting input within a frame of line displayed on a display, the handwriting input corresponding to a part of a character string including one or more characters;
  obtaining, based on the handwriting input, a character size indicating a maximum width and a maximum height of the one or more characters in the character string;
  determining whether the character size is greater than a space size in a direction of the handwriting input, the space size being a size of a space currently being left between the handwriting input and a side of the frame in the direction of the handwriting input to receive another handwriting input; and
  expanding, in a case that the character size is determined to be greater than the space size, the frame by at least a size corresponding to the character size in the direction of the handwriting input, wherein
    in a case that the direction of the handwriting input corresponds to a width direction of the character string, the determining whether the character size is greater than the space size is based on the maximum width indicated by the character size, and
    in a case that the direction of the handwriting input corresponds to a height direction of the character string, the determining whether the character size is greater than the space size is based on the maximum height indicated by the character size.

* * * * *